(12) United States Patent
Hwang et al.

(10) Patent No.: US 6,891,910 B2
(45) Date of Patent: May 10, 2005

(54) BAUD-RATE TIMING RECOVERY

(75) Inventors: Eunjoo Hwang, Kyungsangbuk-Do (KR); JongSang Choi, Kangwon-Do (KR); Deog-Kyoon Jeong, Seoul (KR)

(73) Assignee: Silicon Image, Inc., Sunnyvale, CA (US)

( * ) Notice: Subject to any disclaimer, the term of this patent is extended or adjusted under 35 U.S.C. 154(b) by 842 days.

(21) Appl. No.: 09/759,624

(22) Filed: Jan. 12, 2001

(65) Prior Publication Data

US 2001/0031020 A1 Oct. 18, 2001

Related U.S. Application Data

(60) Provisional application No. 60/176,416, filed on Jan. 14, 2000.

(51) Int. Cl.[7] .............................. H04L 7/00; H03K 7/40
(52) U.S. Cl. ...................................... 375/355; 375/233
(58) Field of Search ................................. 375/229, 230, 375/232–234, 355, 354, 371, 373, 376, 375; 327/298, 299, 141, 154, 155, 156, 162; 708/300, 322, 323

(56) References Cited

U.S. PATENT DOCUMENTS

| | | | |
|---|---|---|---|
| 3,697,689 A | 10/1972 | Gibson | |
| 4,995,031 A | 2/1991 | Aly et al. | 370/32.1 |
| 5,581,585 A | 12/1996 | Takatori et al. | 375/376 |
| 5,675,612 A | 10/1997 | Solve et al. | 375/326 |
| 6,249,557 B1 * | 6/2001 | Takatori et al. | 375/355 |
| 6,414,990 B1 * | 7/2002 | Jonsson et al. | 375/232 |

FOREIGN PATENT DOCUMENTS

WO   WO 98/39873   9/1998

OTHER PUBLICATIONS

Ungerboeck, Gottfried, "Fractional Tap–Spacing Equalizer and Consequences for Clock Recovery in Data Modems", IEEE Transaction on Communications, vol. COM–24, No. 8, Aug. 1976, pp. 856–864.

Mueller, Kurt H., and Müller, Markus, "Timing Recovery in Digital Synchronous Data Receivers", IEEE Transactions on Communications, vol. COM–24, No. 5, May 1976, pp. 516–531.

Belfiore, Carlos A., and Park, John H., Jr., "Decision Feedback Equalization", Proceedings of the IEEE, vol. 67, No. 8, Aug. 1979, pp. 1143–1156.

Gysel, Peter, and Gilg, Dietrich, "Timing Recovery in High Bit–Rate Transmission Systems Over Copper Pairs", IEEE Transactions on Communications, vol. 46, No. 12, Dec. 1998 pp. 1583–1586.

(Continued)

*Primary Examiner*—Tesfaldet Bocure
(74) *Attorney, Agent, or Firm*—Perkins Coie LLP

(57) ABSTRACT

A system and a method for simple and robust baud-rate timing recovery suitable for jointly operating with a decision-feedback equalizer are disclosed. Timing functions for timing recovery are extracted only from filter coefficients of feed-forward and feedback filters. The relation between the coefficients of feed-forward filter and the impulse response is derived under a zero-forcing condition while the relation between the coefficients of the feedback filter and the impulse response is known. Based on the relations, several timing functions with varied degrees of computation are derived, which can drive the sampling instances approximately at the peak point of the channel impulse response. Since the derived timing functions use equalizer coefficients, they work jointly with equalization even without using a training sequence. Simulation results over 5-m and 100-m UTP Category-5 cables at 125M Baud show fast and robust timing recovery operation in a phase-locked loop.

20 Claims, 10 Drawing Sheets

OTHER PUBLICATIONS

Kobayashi, H., "Simultaneous Adaptive Estimation and Decision Algorithm for Carrier Modulated Data Transmission Systems," IEEE Transactions on Communications, V. COM–19, No. 3, Jun. 1971, pp. 268–280.

Gitlin, R.D., and Salz. J., "Timing Recovery in PAM Systems," The Bell System Technical Journal, V. 50, No. 5, May–Jun. 1971, pp. 1645–1669.

Foschini, G.J., "Equalization Without Altering or Detecting Data", AT&T Technical Journal, vol. 64, No. 8, Oct. 1985, pp. 1885–1911.

Bennett, W.R., "Statistics of Regenerative Digital Transmission", Bell Systems Technical Journal, vol. 37, No. 1, Nov. 1958, pp. 1501–1542.

Franks, L.E., and Bubrouski, J. P., "Statistical Properties of Timing Jitter in a PAM Timing Recovery System," IEEE Transactions on Communications, vol. COM–22, No. 7, Jul. 1974, pp. 913–920.

Insight—COSSAP, "Design Synchronization Subsystems in COSSAP", copyright 2001 [online] [retrieved on Apr. 13, 2001], Retrieved from the internet <URL: http://www.synopsys.com/products/dsp/insight/COSSAP_sync_app.html>, pp. 1–2.

Insight—COSSAP, "General Concepts", copyright 2001 [online] [retrieved on Apr. 13, 2001], Retrieved from the internet <URL: http://www.synopsys.com/products/dsp/insight/COSSAP_sync_app2.html>, pp. 1–3.

Insight—COSSAP, "COSSAP Library Blocks for PLL Modeling", copyright 2001 [online] [retrieved on Apr. 13, 2001], Retrieved from the internet <URL: http://www.synopsys.com/products/dsp/insight/COSSAP sync app3.html>, pp. 1–4.

Insight—COSSAP, "Examples", copyright 2001 [online] [retrieved on Apr. 13, 2001], Retrieved from the internet <URL: http://www.synopsys.com/products/dsp/insight/COSSAP_sync_app4.html>, pp. 1–5.

Insight—COSSAP, "Conclusions", copyright 2001 [online] [retrieved on Apr. 13, 2001], Retrieved from the internet <URL: http://www.synopsys.com/products/dsp/insight/COSSAP_sync_app5.html>, pp. 1–3.

Takasaki, Yoshitaka, "Timing Extraction in Baseband Pulse Transmission", IEEE Transactions on Communications, vol. COM–20, No. 5, Oct. 1972, pp. 877–884.

Saltzberg, Burton R., "Timing Recovery for Synchronous Binary Data Transmission", Bell System Technical Journal, vol. 46, Mar. 1967, pp. 593–622.

Lee, Edward A., and Messerschmitt, David G., Digital Communications, Second Edition, Kluwer Academic Publishers, 1994, pp. 748–764.

"Supplement to Carrier Sense Multiple Access With Collision Detection (CSMA/CD) Access Method and Physical Layer Specifications—Physical Layer Parameters and Specifications for 1000 Mb/s Operation Over 4–Pair of Category 5 Balanced Copper Cabling, Type 1000–BASE–T", IEEE Std 802.3ab, 1999 (Supplemental to IEEE Std. 802.3, 1998 Edition), pp. 1–104.

Meyr, Heinrich, and Ascheid, Gerd, "Phase–, Frequency–Locked Loops, and Amplitude Control", Synchronization in Digital Communications, vol. 1, Wiley Series in Telecommunications, 1990, pp. 21–35 and 97.

* cited by examiner

BAUD-RATE TIMING RECOVERY

CROSS-REFERENCES TO RELATED APPLICATIONS

This application relates to U.S. patent application Ser. No. 60/176,416, entitled "Baud-Rate Timing Recovery," filed on Jan. 14, 2000, which is incorporated herein by reference in its entirety.

BACKGROUND OF THE INVENTION

1. Field of the Invention

This invention relates to data communication systems and methods. More particularly, this invention relates to a system and method for timing recovery.

2. Description of the Background Art

Communication systems increasingly depend on digital data transmission. Digital data transmission, in turn, depends on reliable reception of transmitted data. Effective timing recovery facilitates reliable reception of transmitted data in a digital data receiver. More specifically, effective timing recovery facilitates correct sampling instances of the received data stream. In other words, certain digital data receivers continuously adjust the frequency and phase of the receiver clock to optimize the sampling instants of the received data signal and to compensate for frequency drifts between the oscillators used in the transmitter and receiver clock circuits.

A receiver can derive the timing information from the data signal itself. There are at least three timing recovery methods that recover timing information from the data signal. A first method detects the zero-crossing points of sampled data. See B. R. Saltzberg, "Timing recovery for synchronous binary data transmission," *Bell System Technical Journal*, vol.46, pp.593–622, March 1967, which is incorporated herein by reference in its entirety. A receiver determines the sampling points as the mid-point between two adjacent crossings. This mid-point likely coincides with the maximum eye opening in an eye diagram. As is well known in the art, a display, e.g., an oscilloscope, connected to a demodulated, filtered symbol stream, can generate an eye diagram. The display retriggers at every symbol period or fixed multiple of the symbol period using a symbol timing signal derived from the received waveform to produce the eye diagram.

A second method exploits the signal derivatives at the sampling instants. See H. Kobayashi, "Simultaneous adaptive estimation and decision algorithm for carrier modulated data transmission systems," *IEEE Trans. Communications*, vol. COM-19, pp. 268–280, June 1971; R. D. Gitlin and J. Salz, "Timing recovery in PAM systems," *Bell System Technical Journal*, vol. 50, pp. 1645–1669, May–June 1971, which are both incorporated herein by reference in their entirety. This method adjusts the sampling phase until the signal derivative at the sampling instant is zero, at which point, the method samples the data symbols at their peaks.

A third method involves applying a non-linear operation, such as squaring, to the received filtered data stream. The non-linear operation generates a signal with a strong, discrete frequency component, e.g., a spectral line, at the symbol timing frequency. A subsequent filtering operation with a sharp bandpass filter extracts the frequency of the symbol clock. See W. R. Bennett, "Statistics of regenerative digital transmission," *Bell System Technical Journal*, vol.37, pp.1501–1542, November 1958; Y Takasaki, "Timing extraction in baseband pulse transmission," *IEEE Trans. Communications*, vol. COM-20, pp. 877–884, October 1972; L. E. Franks and J. P. Bubrouski, "Statistical properties of timing jitter in a PAM timing recovery system," *IEEE Trans. Communications*, vol. COM-22, pp.913–920, July 1974, which are all incorporated herein by reference in their entirety.

Many baud timing recovery systems use only one sample per baud interval, i.e., they use baud sampling. The information used by the timing recovery methods described above is not available with baud sampling. For example, with respect to the first method described above, a receiver performing baud sampling does not detect signal crossings with any useful precision. Unfortunately, the use of higher sampling rates or additional sampling of the signal derivative for timing recovery is not an appealing solution because of the corresponding increase in expense, complexity, and amount of hardware.

Kurt H. Muller and Markus Muller introduced a baud-rate timing recovery scheme which exploits a timing function based on sampled data and estimated data values. The output of the timing function determines the sampling instants. See "Timing recovery in digital synchronous data receivers," *IEEE Trans. Communications*, vol. COM-24, no.5, pp. 516–531, May 1976 which is incorporated herein by reference in its entirety. The success of the scheme depends on how accurately it can estimate the received data. Hence, when using a channel that severely distorts the transmitted signal, the Muller and Muller scheme can fail to operate properly without a training sequence.

When using a channel that severely distorts the transmitted signal, an automatic equalizer is useful to compensate for the distortion. However, if the system does not incorporate a training sequence, the automatic equalizer will not accurately estimate the incoming data values until the equalizer settles. As noted above, the timing function is a function of the estimated data values and the timing function determines the timing of the sampling instants. Thus, the timing of the sampling instants drifts until the equalizer settles if the timing recovery system uses a timing function that is a function of the sampled data values and the estimated data values. Furthermore, when the timing of the sampling instants drifts the equalizer typically does not achieve stable operation. Consequently, joint operation of the equalizer and the timing recovery system is needed.

U.S. Pat. No. 3,697,689 to E. D. Gibson, entitled "Fine timing recovery system," which is incorporated herein by reference in its entirety, describes one such method, i.e., a method that provides joint operation of the equalization and the timing recovery. The Gibson patent describes using tap coefficients of a linear zero-forcing equalizer with a transversal filter configuration, where if the channel impulse has a peak value, the tap coefficients also have a peak value. The method that Gibson describes adjusts the timing until the main tap coefficient is located at the peak of the impulse response. However, this method inherits the traditional problems present in a linear equalizer, such as noise enhancement.

Expanding on noise enhancement in a linear equalizer, one can represent the input to a linear equalizer as $$x(n) = \sum_i h(i)a(n-i) + N(n).$$

In the above equation, the first term includes inter-symbol interference (ISI) and the second term represents Gaussian noise. A linear equalizer removes ISI not Gaussian noise. A linear equalizer includes a number of taps, each tap time delayed relative to its neighbor, the taps measuring the input. The equalizer multiplies the output of the taps by coefficients and sums the resulting terms. Thus, the equalizer also multiplies the Gaussian noise term in the input by the same coefficients and sums the resulting terms to increase the noise power. Consequently, Noise power is proportional to the number of taps.

Therefore, there is a need for improved systems and methods for timing recovery. There is a need for timing recovery systems with reduced noise enhancement. There is also a need for timing recovery systems that coordinate equalization and timing recovery.

SUMMARY OF THE INVENTION

The present invention provides baud-rate timing recovery methods and systems for recovering timing information from a transmitted signal. Versions of the invention combine timing recovery with equalization. One embodiment achieves the equalization using a decision feedback equalizer (DFE). A DFE enjoys wide popularity in digital data receivers because of its superior performance, relative to a transversal filter, in reducing inter-symbol interference (ISI). See Edward A. Lee and David G. Messerschmitt, *Digital Communication*, Kluwer Academic Publishers, 1994; C. A. Belfiore and Jr. J. H. Park, "Decision feedback equalization," *Proc. IEEE*, vol.67, pp. 1143–1156, August 1979, which are both incorporated herein by reference in their entirety.

A DFE typically comprises a feed-forward filter (FFF) and a feedback filter (FBF) for reducing pre-cursors and post-cursors of the channel impulse response, respectively. Under the zero-forcing condition, the coefficients of a FFF and of a FBF are functions of the channel impulse response. Applying simple arithmetic operations to those coefficients obtains several timing functions. One can define a timing function as the expected timing update that, for example, the timing recovery system converts to a voltage to control a VCO in a PLL. The VCO, in turn, controls the sampling phase of a sampler in the timing recovery system.

One of the most widely known timing functions for binary data is as follows:

$$E\{z_k\} = \frac{1}{2}E\{x(k)a(k-1) - x(k-1)a(k)\}/E\{a(k)^2\} \quad (1)$$

$$= \frac{1}{2}(h(1) - h(-1)) \quad (2)$$

where $x(k)$ is the k-th sample of received data, $a(k)$ is the estimation of $x(k)$, and $h(l)$ is the first post-cursor and $h(-1)$ is the first pre-cursor. One can define the timing function $f(\tau_k) = E\{z_k\}$, where $z_k$ is a stochastic function of the timing error in the kth sample, $\tau_k$. If one substitutes $$x(k) = \sum_i h(i)a(k-i) \text{ and } E\{a(m)a(n)\} = \begin{cases} E\{a(m)^2\} & m = n \\ 0 & \text{otherwise,} \end{cases}$$

(1) will result in (2). When the channel impulse response is symmetrical, the optimum sampling instance is reached at the peak point of the impulse response, where $E\{z_k\}$ is 0.

When the channel impulse response is not symmetrical, the optimum sampling point can be reached by scaling the terms in equation (1) as follows:

$$E\{z_k\} = \frac{1}{2}E\{\alpha x(k)a(k-1) - \beta x(k-1)a(k)\}/E\{a(k)^2\}. \quad (3)$$

For more information on scaling the timing function, see Peter Gysel and Dietrich Gilg, "Timing recovery in high bit-rate transmission systems over copper pairs," *IEEE Trans. Communications*, vol.46, no.12, pp.1583–1586, December 1998, which is incorporated herein by reference in its entirety.

However, in a severely distorted channel, the estimated values, $a(k)$ and $a(k-1)$, are not available until the equalizer compensates for the channel distortion. As a consequence, a training sequence is needed for both the equalizer and the timing function.

Thus, rather than use the above-referenced configurations and timing functions, one version of the present invention provides a sampler, a DFE, and a timing error detector. The sampler has first and second inputs and an output. The first input receives a transmitted signal. The second input receives a clock signal. The sampler operates to sample a transmitted signal according to the clock signal.

The DFE has an input and first and second outputs. The input couples to the output of the sampler. The DFE has a first pre-cursor tap providing the first output and a first post-cursor tap providing the second output.

The timing error detector has first and second inputs and an output. The first input couples to the first output of the DFE and the second input couples to the second output of the DFE. The timing error detector operates to provide at the output a signal representative of the timing error reflected in the sampled transmitted signal. The clock signal at the second input of the sampler is derived using the signal provided at the output of the timing error detector.

Another version of the invention provides a baud-rate timing recovery method for recovering timing information from a transmitted signal. The method includes sampling a transmitted signal using a sampler having first and second inputs and an output. The first input receives a transmitted signal. The second input receives a clock signal. The sampler operates to sample a transmitted signal according to the clock signal;

The method further includes equalizing the sampled, transmitted signal using a DFE. The DFE has an input and first and second outputs. The input couples to the output of the sampler. The DFE has a first pre-cursor tap providing the first output and a first post-cursor tap providing the second output.

The method also includes deriving a signal representative of a timing error reflected in the sampled, transmitted signal using a timing error detector. The timing error detector has first and second inputs and an output. The first input couples to the first output of the DFE and the second input couples to the second output of the DFE. The timing error detector operates to provide the signal representative of the timing error at the output. The clock signal at the second input of the sampler is derived using the signal provided at the output of the timing error detector.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

A. Derivation of New Timing Functions

Figure 1:
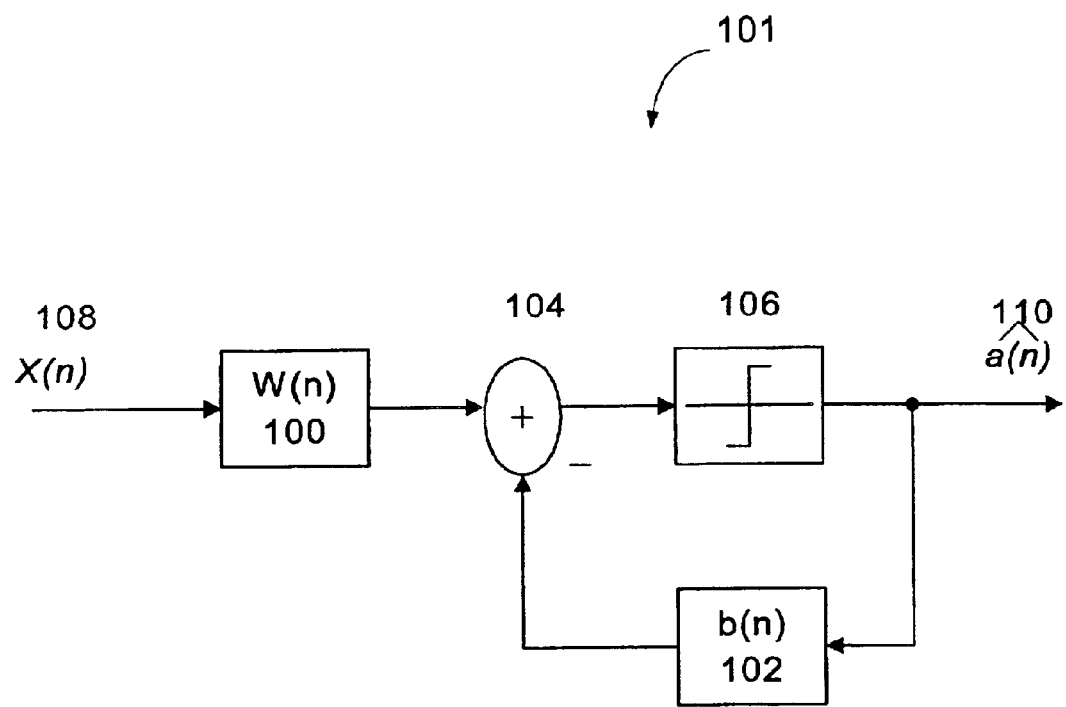
FIG. 1 is a block diagram of a decision feedback equalizer.

FIG. 1 shows a block diagram of the DFE 101 combined with a feed-forward filter (FFF) 100. The FFF 100, having filter coefficients w(n) where n is the sample number, rejects pre-cursors, while the feedback filter (FBF) 102 eliminates post-cursors of the channel impulse response. If the sampled channel impulse response is h(n), then the feedback filter coefficients b(n) satisfy $$b(n) = \frac{h(n)}{h(0)}, n > 0.$$

After the FBF removes post-cursors, only the channel impulse response is left in the pre-cursors. Then, the received signal at the equalizer input, represented by x(n), is as follows:

$$x(n) = \sum_{i=-\infty}^{0} h(i)a(n-i)$$

where a(i) represents transmitted, noiseless data. If the feed-forward filter has N taps and the indexes of the taps decrease from the right-most main tap with index N−1, then the filtered output, â (n), is obtained as follows:

$$\hat{a}(n) = \sum_{i=0}^{N-1} w(N-i-1)x(n+i)$$

$$= \sum_{i=0}^{N-1} w(N-i-1) \sum_{j=-\infty}^{0} h(j)a(n+i-j)$$

$$= \sum_{i=0}^{N-1} w(N-i-1) \sum_{j=0}^{\infty} h(-j)a(n+i+j).$$

After substitution of the sum of the indexes i+j by a new index k, the above equation is reduced to $$\hat{a}(n) = \sum_{k=0}^{\infty} a(n+k) \sum_{j=0}^{k} w(N-k+j-1)h(-j).$$

The output of the feed-forward filter, â (n), is equal to a(n) when perfect equalization is achieved. Under the zero-forcing condition, the terms in the above equation should be zeros except when k is equal to zero.

$$w(N-1)h(0) = 1$$

$$\sum_{j=0}^{k} w(N-k+j-1)h(-j) = 0, k \neq 0.$$

where the main tap and the adjacent tap coefficients of the feed-forward filter are represented by the channel impulse response, h(n), as follows:

$$w(N-1) = \frac{1}{h(0)}$$

$$w(N-2) = -\frac{w(N-1)h(-1)}{h(0)}$$

$$= -\frac{h(-1)}{h(0)^2}.$$

By combining the coefficients of the main tap 130, the adjacent tap 128, and the first feedback filter tap 132, the following timing function can be obtained:

$$z_0(n) = \frac{b(1)}{w(N-1)} + \frac{w(N-2)}{w(N-1)^2} \quad (4)$$

$$= h(1) - h(-1)$$

By removing w(N−1) in the denominator of both terms, another timing function is derived as follows:

$$z_1(n) = b(1) + \frac{w(N-2)}{w(N-1)} \quad (5)$$

$$= \frac{h(1) - h(-1)}{h(0)}.$$

A division operation usually relies upon more complicated hardware than a multiplication operation. Therefore, one can derive another timing function that does not use division by multiplying: $z_1$ by w(N−1) to obtain:

$$z_2(n) = b(1)w(N-1) + w(N-2) \quad (6)$$

$$= \frac{h(1) - h(-1)}{h(0)^2}.$$

Alternatively, one can derive a timing function that does not involve multiplication of tap coefficients:

$$z_3(n) = k_1 b(1) + k_2 w(N-2) \quad (7)$$

$$= k_1 \frac{h(1)}{h(0)} - k_2 \frac{h(-1)}{h(0)^2}.$$

where constants $k_1$ and $k_2$, should be carefully chosen to balance the inherently different scaling factors of b(1) and w(N−2).

For those channels with an asymmetrical impulse response, the above timing functions can be modified by incorporating two scale factors, $\alpha$ and $\beta$, as follows:

$$z_0(n) = \alpha_0 \frac{b(1)}{w(N-1)} + \beta_0 \frac{w(N-2)}{w(N-1)^2}$$

$$z_1(n) = \alpha_1 b(1) + \beta_1 \frac{w(N-2)}{w(N-1)}$$

$$z_2(n) = \alpha_2 b(1) w(N-1) + \beta_2 w(N-2)$$

$$z_3(n) = \alpha_3' k_1 b(1) + \beta_3' k_2 w(N-2)$$

$$= \alpha_3 b(1) + \beta_3 w(N-2).$$

Figure 4:
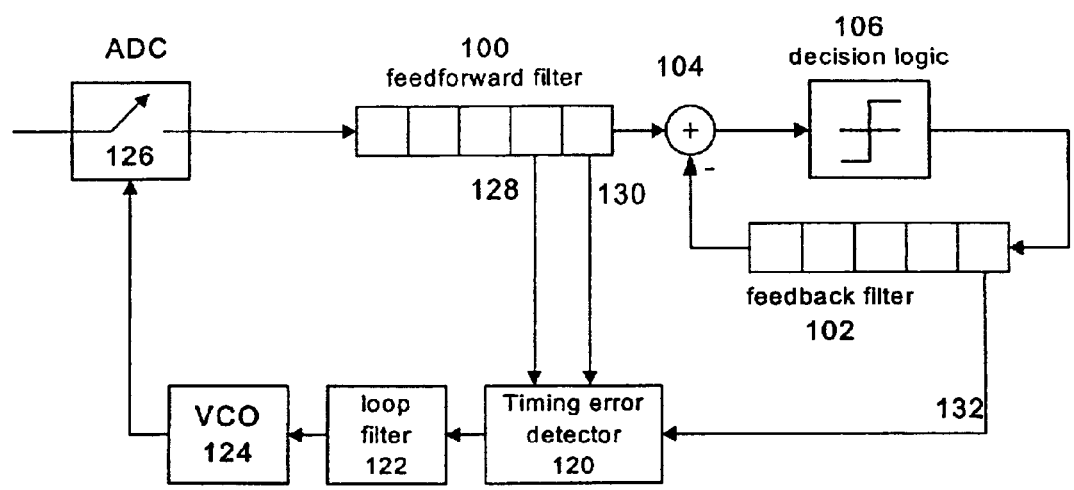
FIG. 4 is a block diagram of a preferred embodiment of the timing recovery system in accordance with the present invention.
Figure 7:
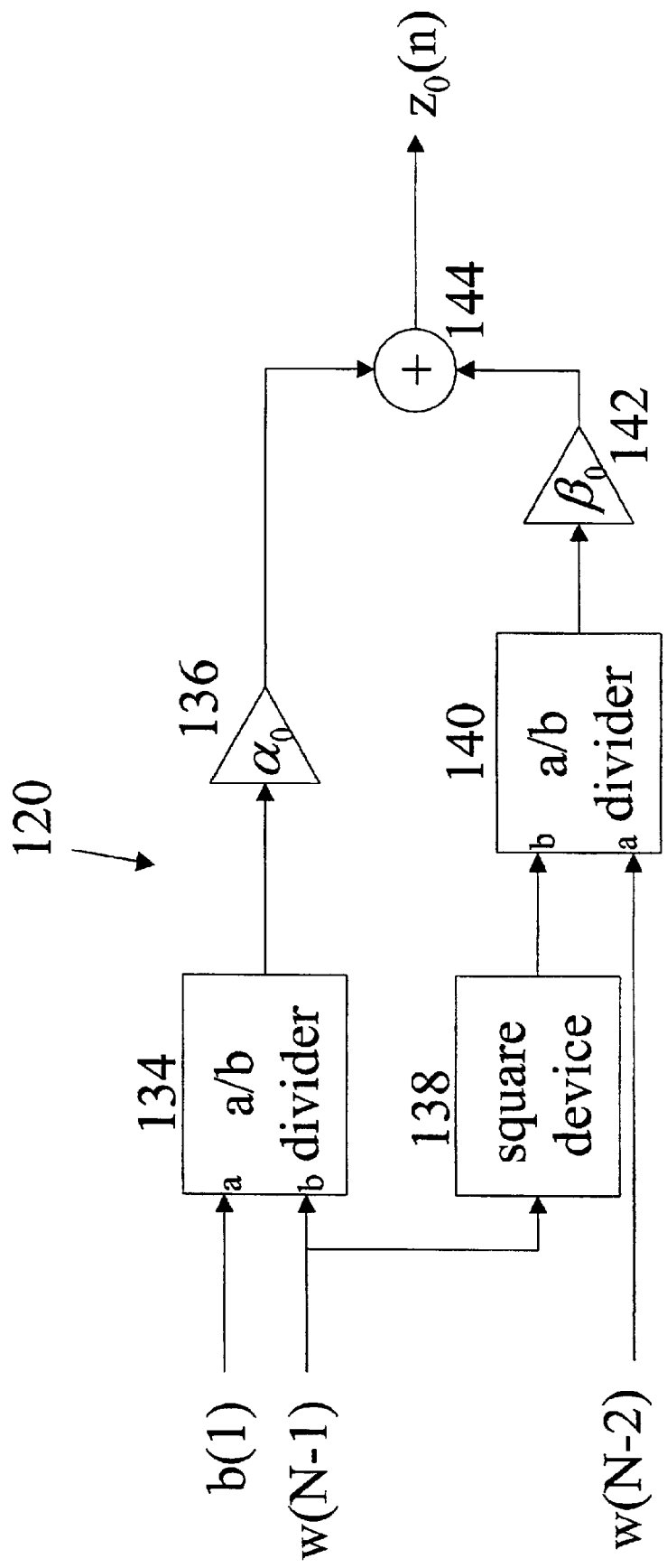
FIG. 7 is a block diagram of one embodiment of the timing error detector of FIG. 4.

FIG. 7 is a block diagram of one embodiment of the timing error detector 120 of FIG. 4 according to the timing function $z_0(n)$. The first post-cursor b(1) and the main tap, w(N−1), are the a and b inputs, respectively, of an a/b divider 134. The output of the a/b divider 134 is the input of an amplifier 136 for scaling the output of the a/b divider 134 by a factor of $\alpha_0$. The output of the amplifier 136 is the first of two inputs to a summing logic 144.

The main tap, w(N−1) is also the input to a squaring device 138. The first pre-cursor, w(N−2), and the output of the squaring device are the a and b inputs, respectively, to a a/b divider 140. The output of the a/b divider 140 is the input to an amplifier 142 for scaling the output of the a/b divider 140 by a factor of $\beta_0$. The output of the amplifier 142 is the second of two inputs to the summing logic 144. The output of the summing logic 144 is the timing function $z_0(n)$ and is the output of this embodiment of the timing error detector.

Figure 8:
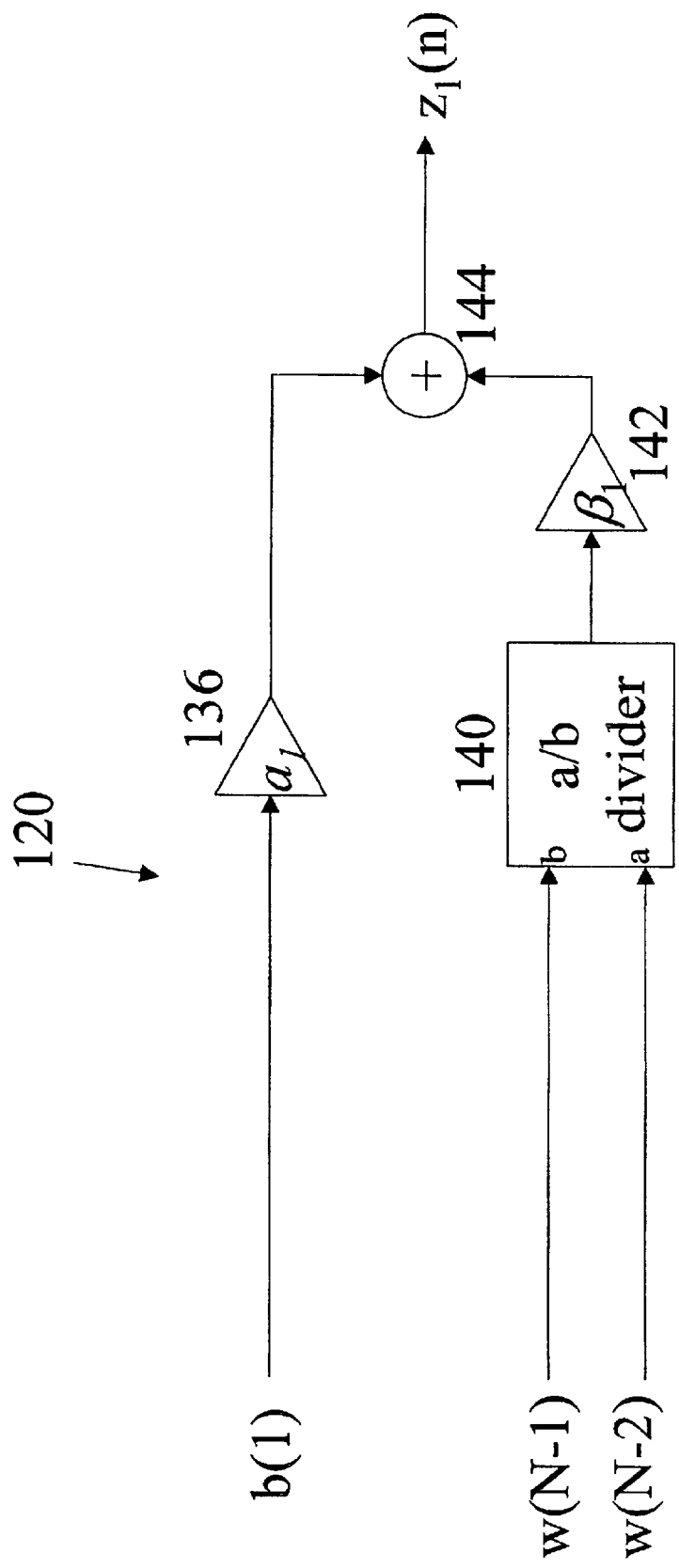
FIG. 8 is a block diagram of an alternative embodiment of the timing error detector of FIG. 4.

FIG. 8 is a block diagram of another embodiment of the timing error detector 120 of FIG. 4 according to the timing function $z_1(n)$. The first post-cursor, b(1), is the input to amplifier 136 for scaling the post-cursor by a factor of $\alpha_1$. The output of the amplifier 136 is the first of two inputs to a summing logic 144.

The first pre-cursor, w(N−2), and the main tap, w(N−1), are the a and b inputs, respectively, for an a/b divider 140. The output of the a/b divider 140 is the input of an amplifier 142 that scales the output of the a/b divider 140 by a factor of $\beta_1$. The output of the amplifier 142 is the second of two inputs to the summing logic 144. The output of the summing logic 144 is the timing function $z_1(n)$ and is the output of this embodiment of the timing error detector.

Figure 9:
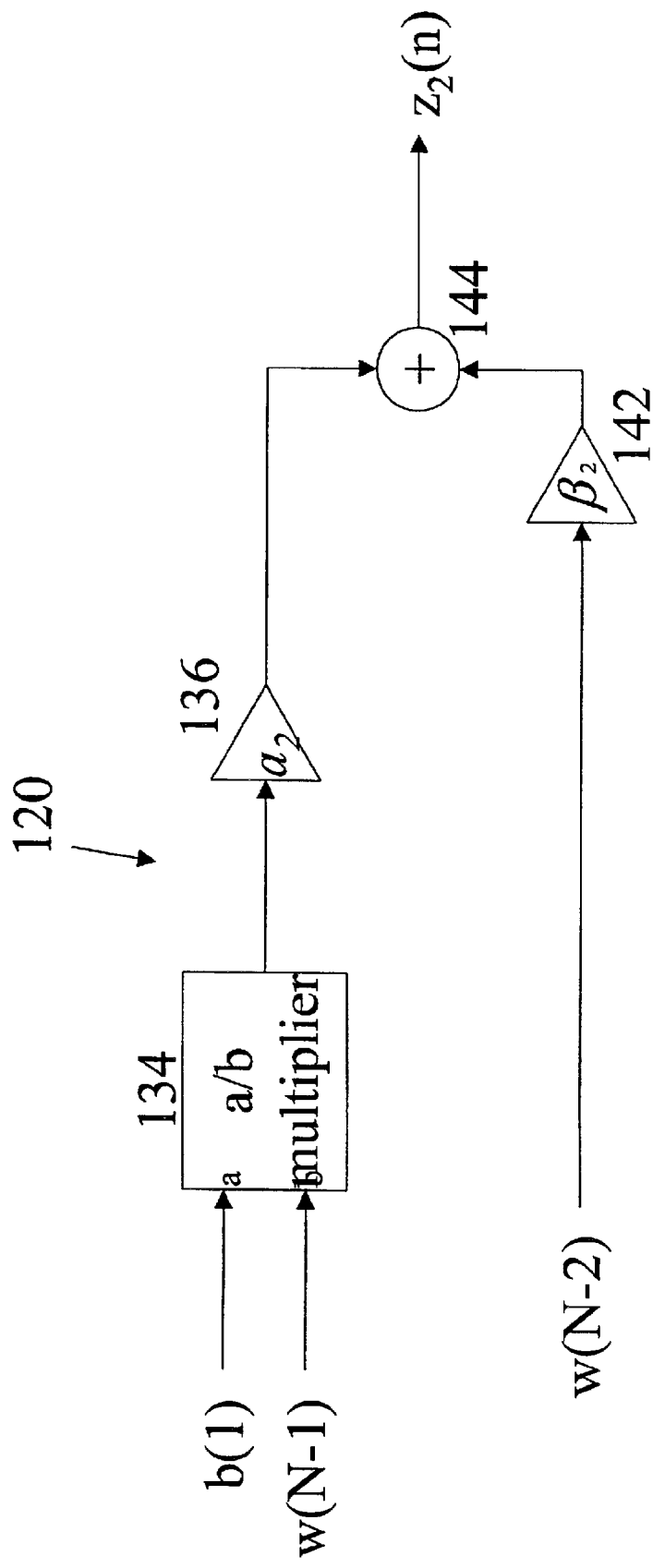
FIG. 9 is a block diagram of an another alternative embodiment of the timing error detector of FIG. 4.

FIG. 9 is a block diagram of another embodiment of the timing error detector 120 of FIG. 4 according to the timing function $z_2(n)$. The first post-cursor, b(1), and the main tap, w(N−1), are the a and b inputs, respectively to an a/b divider 134. The output of the a/b divider 134 is the input to amplifier 136 for scaling the post-cursor by a factor of $\alpha_2$. The output of the amplifier 136 is the first of two inputs to a summing logic 144.

The first pre-cursor, w(N−2), is the input of an amplifier 142 that scales the first pre-cursor by a factor of $\beta_2$. The output of the amplifier 142 is the second of two inputs to the summing logic 144. The output of the summing logic 144 is the timing function $z_2(n)$ and is the output of this embodiment of the timing error detector.

Figure 10:
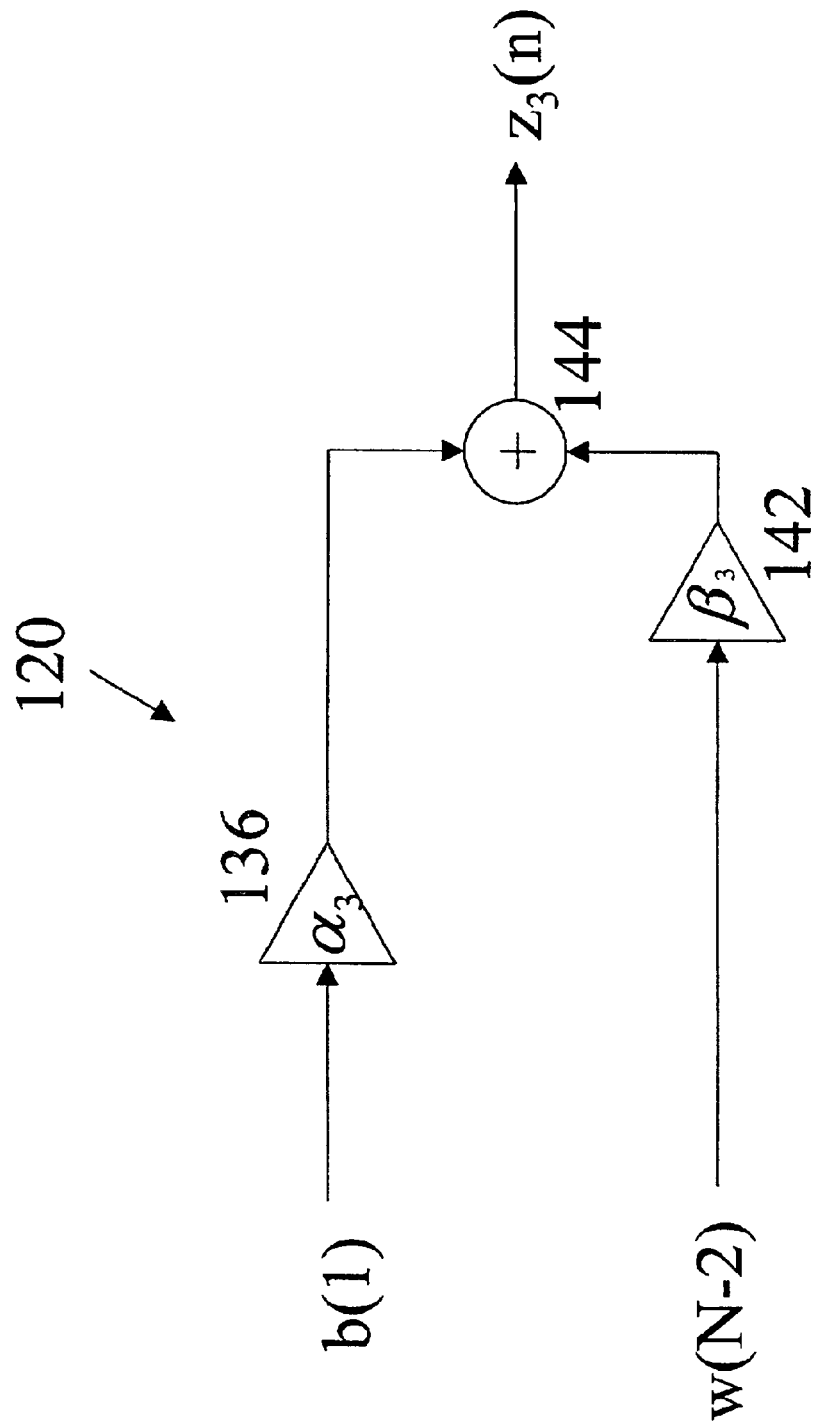
FIG. 10 is a block diagram of an another alternative embodiment of the timing error detector of FIG. 4.

FIG. 10 is a block diagram of another embodiment of the timing error detector 120 of FIG. 4 according to the timing function $z_3(n)$. The first post-cursor, b(1), is the input to amplifier 136 for scaling the post-cursor by a factor of $\alpha_3$. The output of the amplifier 136 is the first of two inputs to a summing logic 144.

The first pre-cursor, w(N−2), is the input of an amplifier 142 that scales the first pre-cursor by a factor of $\beta_3$. The output of the amplifier 142 is the second of two inputs to the summing logic 144. The output of the summing logic 144 is the timing function $z_3(n)$ and is the output of this embodiment of the timing error detector.

Figure 2:
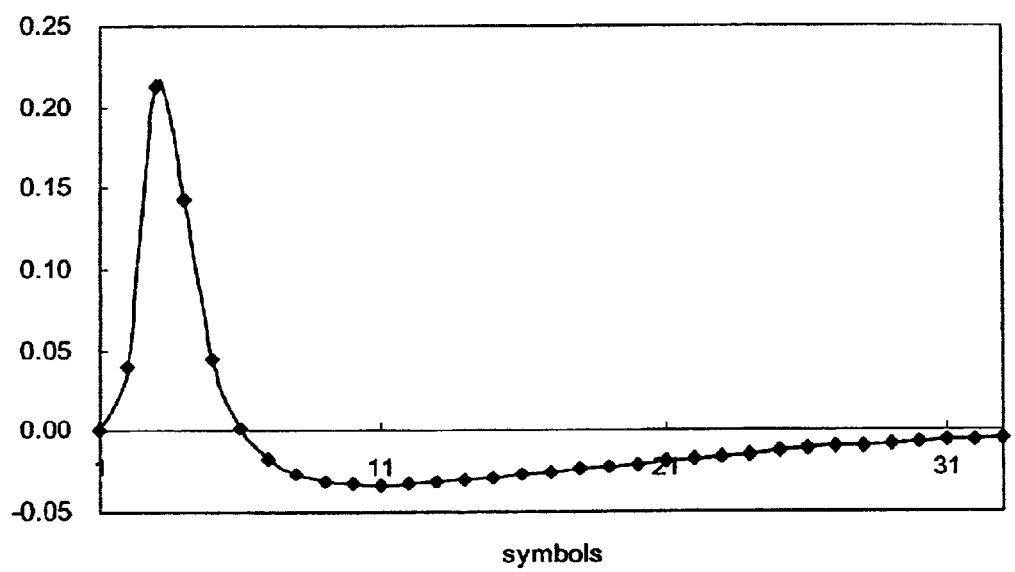
FIG. 2 is a plot of impulse response of the 100m UTP Category-5 cable with external effects.

A s will be clear to those of skill in the art, a variety of other embodiments of the timing error detector are possible in hardware and/or software. The embodiments described above are intended to be illustrative and not limiting B. Characteristics of New Timing Functions The scale factors shown above should be chosen properly according to the channel environment when the impulse response of the channel is asymmetrical. FIG. 2 shows the impulse response of the 100 m-length UTP Category-5 cable including the effect of a digital shaping filter having a filtering function=$0.75+0.25z^{-1}$ (where z is the complex impedance), of an analog low-pass transmit/receive filter, and of a hybrid transformer with a cut-off frequency of 200 kHz. For more details, see *Physical layer specification for 1000 Mb/s operation on four pairs of Category 5 or better balanced twisted pair cable*, IEEE Std 802.3ab, 1998, which is incorporated by reference in its entirety herein. The asymmetric characteristics of the UTP Category-5 cable appear regardless of its length. Table I shows the value of first post-cursor and pre-cursor of the UTP Category-5 cable with a varied length.

TABLE I

THE FIRST POST-CURSOR AND PRE-CURSOR OF THE IMPULSE RESPONSE OF THE UTP CATEGORY-5 CABLE WITH EXTERNAL EFFECTS.

| Cable length | h(−1) | h(0) | h(1) |
| --- | --- | --- | --- |
| 5 m | 0.00013 | 0.67 | 0.23 |
| 10 m | 0.00015 | 0.66 | 0.24 |
| 20 m | 0.00011 | 0.60 | 0.24 |
| 30 m | 0.0016 | 0.54 | 0.24 |
| 40 m | 0.0027 | 0.48 | 0.24 |
| 50 m | 0.0063 | 0.43 | 0.23 |
| 60 m | 0.011 | 0.38 | 0.22 |
| 70 m | 0.016 | 0.34 | 0.21 |
| 80 m | 0.021 | 0.3 | 0.20 |
| 90 m | 0.027 | 0.27 | 0.19 |
| 100 m | 0.040 | 0.21 | 0.14 |

The suitable scale factors of the timing functions for the channels in Table I are listed in Table II.

TABLE II

THE SCALE FACTORS OF TIMING FUNCTIONS.

| Cable length | $\alpha_0, \alpha_1, \alpha_2, \alpha_3$ | $\beta_0, \beta_1, \beta_2$ | $\beta_3$ |
| --- | --- | --- | --- |
| 5 m | 1 | 1769 | 1185 |
| 10 m | 1 | 1600 | 1072 |
| 20 m | 1 | 2182 | 1309 |
| 30 m | 1 | 150 | 81 |
| 40 m | 1 | 89 | 43 |
| 50 m | 1 | 37 | 16 |
| 60 m | 1 | 20 | 7.6 |
| 70 m | 1 | 13 | 4.5 |
| 80 m | 1 | 9.5 | 2.9 |
| 90 m | 1 | 7.0 | 1.9 |
| 100 m | 1 | 3.5 | 2.2 |

Figure 3:
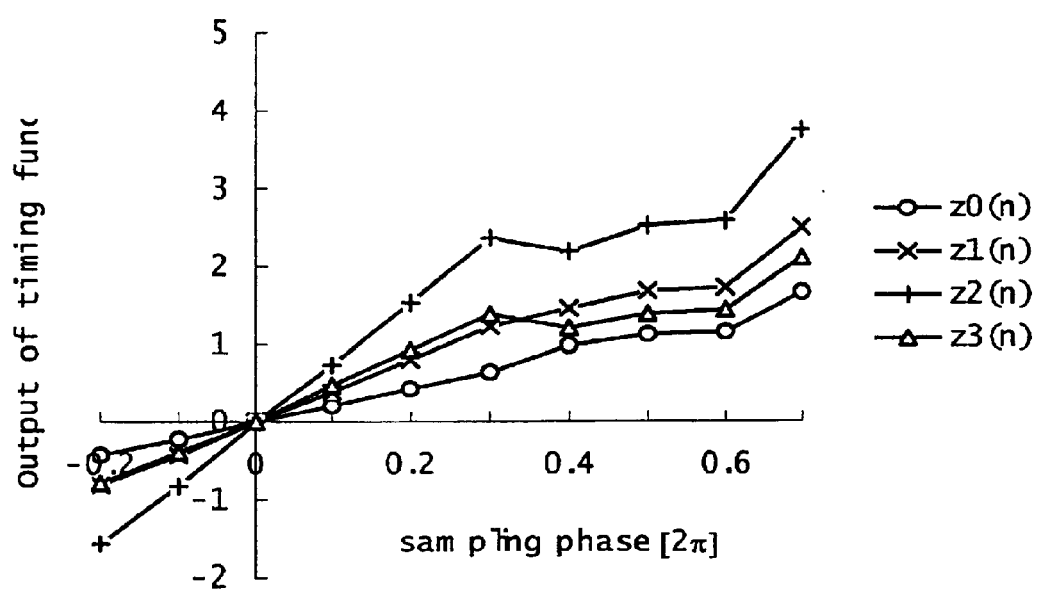
FIG. 3 is a plot of the output of the timing functions.

$\alpha$ and $\beta$ are selected to yield a zero for each timing function when in the optimal timing phase. In other words, to obtain the ratio between $\alpha$ and $\beta$, one inserts the measured values for h(1), h(0), and h(−1) from table I into equations 4, 5, 6, and 7 above, the equations having been modified so that the first term is multiplied by $\alpha$ and the second term is multiplied by β. Then one sets the resulting equations equal to zero and solves for the ratio of α and β. Having obtained the ratio, one can set α=1 to obtain β. In this way, one selects α and β to provide a zero correction when in the timing phase is optimal. Detector characteristics of the timing functions with scale factors for the impulse response of the 100-m UTP Category-5 cable are plotted in FIG. 3. Although they are not monotonic for a small range of sampling phases, all four timing functions show linear characteristics around the zero phase or at the optimum sampling phase.

C. Timing Recovery System with Phase Locked Loop

A timing recovery system consists of a timing error detector 120, a loop filter 122, and a voltage-controlled oscillator (VCO) 124 to form a Phase-Locked Loop (PLL). FIG. 4 shows a block diagram of one embodiment of the invention, where the timing error detector 120 uses one of the timing functions derived above. Although digitally controlled VCOs or Numerically Controlled Oscillators (NCOs) are available, an analog loop filter and a VCO may also be incorporated.

The transfer function of the loop filter, $H_{loop}(s)$, and the transfer function of the VCO, $H_{VCO}(s)$, are $$H_{loop}(s) = K_1 + \frac{K_2}{s}$$

$$H_{VCO}(s) = \frac{K_{VCO}}{s}.$$

where K1 and K2 are arbitrary constants and Kvco is a constant for the VCO and s represents frequency. For more details, see *Synopsys Online Documentation-Designing Synchronization Subsystems in COSSAP*, Synopsys, Inc., 1998, which is incorporated by reference herein in its entirety.

The overall closed loop transfer function, H(s), is $$H(s) = \frac{1}{1 + K_t K_{VCO} H_{loop}(s)/s}$$

where $K_t$ is the gain of the timing error detector. The damping ratio, ξ, and the normalized loop bandwidth, BL, have the following relationship $$\omega_n^2 = K_t K_{VCO} K_2$$

$$\xi = \frac{K_t K_{VCO} K_1}{2\omega_n}$$

$$BL = \frac{\omega_n}{2}\left(\xi + \frac{1}{4\xi}\right)$$

where $\omega_n$, is a natural frequency of the system. $K_1$ and $K_2$ should be chosen to satisfy the desired damping ratio and the loop bandwidth. These equations allow for the calculation of K1 and K2. For more details, see H. Meyr and G. Ascheid, *Synchronization in Digital Communication Volume* 1, Wiley Series, which is incorporated by reference in its entirety herein.

The timing functions are derived from the feed-forward and feedback filter coefficients with varying amounts of computation. The functions are based on the derived relations between the coefficients of feed-forward and feedback filters and the channel impulse response. The most complex timing function would need two divisions, three multiplications, and one addition, whereas the least complex one would need only two multiplications and one addition.

D. Simulation Results

Figure 5:
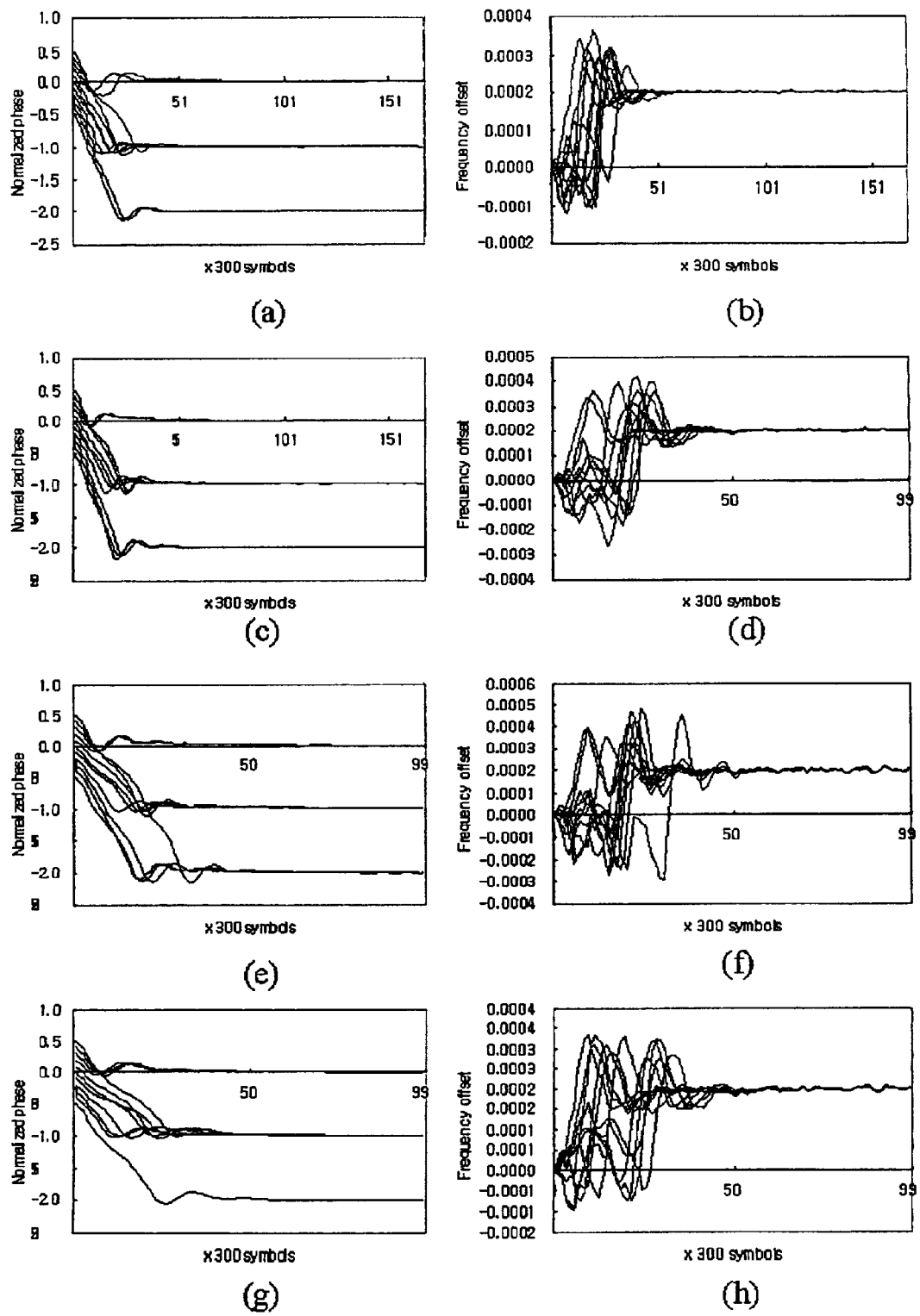
FIG. 5 shows plots of the simulation results of phase locking process for the 100-m cable environment.
Figure 6:
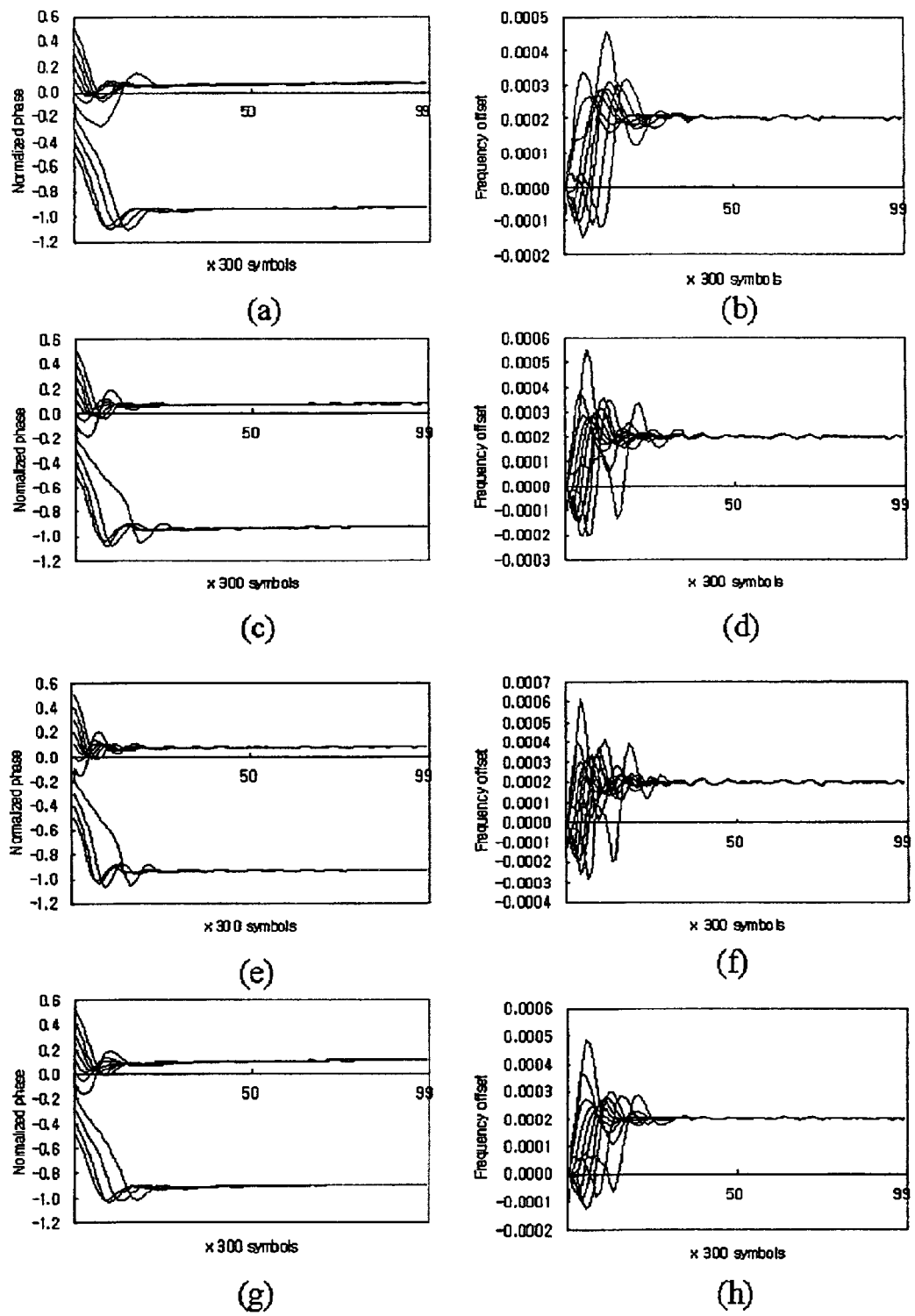
FIG. 6 shows plots of the simulation results of phase locking process for the 5-m cable environment.

FIGS. 2, 5, and 6 and Tables I and II show the results of the simulated performance of the four timing functions described above. The simulated performance used 125-M Baud signaling with 100-m and 5-m UTP Category-5 cables. FIG. 2 shows the channel impulse. The gains of the derived timing functions, $K_t$, are 0.32, 0.60, 1.16, and 0.74, respectively. $K_{VCO}$ has the normalized value of 1, and $K_1$ and $K_2$ were selected as 0.001 and 0.0000001, respectively. In the simulations, the free running frequency of the VCO is displaced from the transmitter clock frequency by 200 parts per million (ppm).

FIG. 5 shows the frequency locking process of the VCO and the acquisition of the sampling phase when $z_0(n)$, $z_1(n)$, $z_2(n)$, and $z_3(n)$ are used as timing functions with varied initial sampling phases from –0.5 to 0.5. Since the impulse response is not symmetrical, the scale factor of $z_0(n)$ for a 100-m cable shown in Table II is used.

For equalization, the following decision-directed algorithm is incorporated to work jointly with the timing recovery $$y(n) = \sum_{i=0}^{N-1} w_n(i)x(n+N-1+i) + \sum_{i=1}^{M} b_n(i)\hat{y}(n-i)$$

$$e(n) = \hat{y}(n) - y(n)$$

$$w_{n+1}(i) = w_n(i) + \mu e(n)x(n+N-1+i) \quad i = 0, \ldots, N-1$$

$$b_{n+1}(i) = b_n(i) + \mu e(n)\hat{y}(n-i) \quad i = 1, \ldots, M$$

where y(n) is filtered output, ý (n) is the nearest decision value, and N and M correspond to the number of taps in feed-forward and feedback filters, respectively. To assure the convergence of the decision-directed algorithm, the coefficient of the main tap, h(0), is initialized to a high value considering the variations of the channel impulse response See G. J. Foschini, "Equalization without altering or detecting data," *AT&T Technical Journal*, vol. 64, pp. 1885–1911, October 1985, which is incorporated herein by reference in its entirety. Blind equalization algorithms may also be used without altering the timing functions. A blind equalization algorithm is an equalization algorithm that does not enjoy the benefit of a training sequence.

FIGS. 5(*a*), 5(*c*), 5(*e*), and 5(*g*) show the output of the loop filter. Since the free running frequency of the VCO clock of the receiver is slower than the transmitter clock by 200 ppm, the output of the loop filter should be 0.0002 when the frequency lock is reached. In FIGS. 5(*b*), 5(*d*), 5(*f*), and 5(*h*), the sampling phase is normalized to 2π so that –π and π correspond to –0.5 and 0.5, respectively. Thus, the sampling phase should be settled at an integer value when the phase lock is reached.

In most cases, since the channel impulse response is not known beforehand, the scale factors cannot be determined. However, based on the present simulations, one can estimate the worst-case impulse response, and one can use scale factors based on the worst case estimate without any severe degradation in performance. Simulation results for the 5-m cable (best case) with the scale factors obtained from the 100-m cable (worst case) are shown in FIG. 6. Frequency lock with the timing offset of less than 0.1 is reached with a negligible degradation in SNR.

The simulations show that frequency lock and phase lock are reached in less than 20,000 symbols with a settling behavior typically found in adaptive systems. The simulation results show that all of the timing functions derived work robustly in a severely distorted channel as well as in a moderately distorted one when they are incorporated in a PLL with decision-directed equalization. The PLL's lock is reached in less than 20,000 symbols for all the timing functions and under all initial conditions with the steady-state phase offset of less than 0.1 symbol time.

Another advantage of embodiments of the present invention is the reduction in noise enhancement. As noted above, a linear equalizer includes a number of taps, each tap time delayed relative to its neighbor, the taps measuring the input. The linear equalizer multiplies the output of the taps by coefficients and sums the resulting terms. Thus, the equalizer also multiplies the Gaussian noise term in the input by the same coefficients and sums the resulting terms to increase the noise power. Consequently, Noise power is proportional to the number of taps. On the other hand, a DFE consists of a FFF and a FBF and the input to the FBF is noiseless because the input to the FBF is from a slicer. Thus, the number of taps in a FFF is fewer than that in a linear filter. As a result, a DFE has less noise enhancement than a linear filter.

While the invention has been described with reference to preferred embodiments, it is not intended to be limited to those embodiments. It will be appreciated by those of ordinary skilled in the art that many modifications can be made to the structure and form of the described embodiments without departing from the spirit and scope of this invention.

What is claimed is:

1. A baud-rate timing recovery system for recovering timing information from a transmitted signal, the system comprising:
   a sampler having first and second inputs and an output, the first input adapted to receive a transmitted signal, the second input adapted to receive a clock signal, the sampler operative to sample a transmitted signal according to the clock signal;
   a DFE having an input and first and second outputs, the input coupled to the output of the sampler, the DFE having a first pre-cursor tap providing the first output and a first post-cursor tap providing the second output; and
   a timing error detector having first and second inputs and in output, the first input coupled to the first output of the DFE and the second input coupled to the second output of the DFE, the liming error detector operative to provide at the output a signal that includes a ratio of the first and second inputs, wherein the signal is representative of the timing error reflected in the sampled transmitted signal, the signal provided at the output of the timing error detector being used to derive the clock signal at the second input of the sampler.

2. The baud-rate timing recovery system of claim 1, wherein the system further comprises:
   a loop filter having an input and mu output, the input coupled to th output of the timing error detector, the loop filter operative to filter the signal provided by the timing error detector; and
   a VCO having an input and an output, the input coupled to the output of the loop filter, the output coupled to the second input of the sampler, the VCO operative to provide a clock signal as a function of the voltage supplied by the loop filter.

3. The baud-rate timing recovery system of claim 1, wherein the system further comprises:
   a NCO having an input and an output of the NCO coupled to the output of the timing error detector, the output of the NCO coupled to the second input of the sampler, the NCO operative to provide a clock signal as a function of the signal supplied by the timing error detector.

4. The baud-rate timing recovery system of claim 1, wherein the timing error detector comprises
   timing function means for providing at the output a signal representative of the timing error reflected in the sampled transmitted signal, the timing function means operative to provide a signal that is the weighed sum of the first pre-cursor and the first post-cursor.

5. The baud-rate timing recovery system claim 1, wherein the DFE has a third output, the DFE having a main tap for providing the third output and wherein the timing error detector has a third input, the third input coupled to the third output of the DFE.

6. The baud-rate timing recovery system of claim 1, wherein the timing error detector comprises
   timing function means for providing at the output a signal representative of the timing error reflected in the sampled transmitted signal, the timing function means operative to provide a signal according to the timing function:
   $$z_0(n) = \alpha_0 \frac{b(1)}{w(N-1)} + \beta_0 \frac{w(N-2)}{w(N-1)^2}.$$

7. The baud-rate timing recovery system of claim 1, wherein timing error detector comprises
   timing functions means for providing at the output a signal representative of the timing error reflected in the sampled transmitted signal, the timing function means operative to provide a signal according to the timing function:
   $$z_1(n) = \alpha_1 b(1) + \beta_1 \frac{w(N-2)}{w(N-1)}.$$

8. The baud-rate timing recovery system of claim 1, wherein the timing error detector comprises
   timing function means for providing at the output a signal representative of the timing error reflected in the sampled transmitted signal, the timing function means operative to provide a signal according to the timing function: $z_1(n) = a_2 b(1)w(N-1) + \beta_2 w(N-2)$.

9. A baud-rate timing recovery method for recovering timing information from a transmitted signal, the method comprising:
   sampling a transmitted signal using a sampler having first and second inputs and an output, the first input adapted to receive a transmitted signal, the second input adapted to receive a clock signal, the sampler operative to sample a transmitted signal according to the clock signal;
   equalizing the sampled, transmitted signal using a DFE having an input and first and second outputs, the input coupled to the output of the sampler, the DFE having a first pre-cursor tap providing the first output and a first post-cursor tap providing the second output; and
   deriving a signal representative of a timing error reflected in the sampled, transmitted signal using a timing error detector having first and second inputs and an output, the first input coupled to the first output of the DFE and the second input coupled to the second output of the DFE, the timing error detector operative to provide the signal that includes a ratio of the first and second inputs, wherein the signal is representative of the timing error at the output, the signal provided at the output of the timing error detector being used to derive the clock signal at the second input of the sampler.

10. The baud-rate timing recovery method of claim 9, wherein deriving a signal representative of a timing error comprises:
    using a timing error detector having timing function means for providing at the output a signal representative of the timing error, the timing function means operative to provide a signal that is the weighed sum of the first pre-cursor and the first post-cursor.

11. The baud-rate timing recovery method of claim 9, wherein equalizing the sampled, transmitted signal comprises using a DFE having a third output, the DFE having a main tap for providing the third output; and wherein deriving a signal representative of a timing error comprises using a timing error detector having a third input, the third input coupled to the third output of the DFE.

12. The baud-rate timing recovery method 9, wherein deriving a signal representative of a timing error comprises:

using a timing error detector having timing functions means for providing at the output a signal representative of the timing error, the timing function means operative to provide a signal according to the timing function:

$$z_0(n) = \alpha_0 \frac{b(1)}{w(N-1)} + \beta_0 \frac{w(N-2)}{w(N-1)^2}.$$

13. The baud-rate timing recovery method of claim 9, wherein deriving a signal representative of a timing error comprises:

using a timing error detector having timing function means for providing at the output a signal representative of the timing error, the timing function means operative to provide a signal according to the timing function:

$$z_1(n) = \alpha_1 b(1) + \beta_1 \frac{w(N-2)}{w(N-1)}.$$

14. The baud-rate timing recovery method of claim 9, wherein deriving a signal representative of a timing error comprises:

using a timing error detector having timing function means for providing at the output a signal representative of the timing error, the timing function means operative to provide a signal according to the timing function: $z_2(n)=a_2 b(1)w(N-1)+\beta_2 w(N-2)$.

15. A baud-rate timing recovery system fur recovering timing information from a transmitted signal, the system comprising:

an ADC having first and second inputs and an output, the first input adapted to receive a transmitted signal, the second input adapted to receive a clock signal, the ADC operative to sample a transmitted signal according to the clock signal;

a DFE operative to equalize transmitted signal, the DFE comprising:

a FFF having an input and at least first, second and third outputs, the input coupled to the output of the sampler, the FFF having at least a first pre-cursor tap providing the first output and a main tap providing the second output, the FFF operative to reduce at least one precursor in the sampled transmitted signal to produce a forward filtered signal on the third output;

subtraction logic having first and second inputs and an output, the first input coupled to the third output of the FFF, the subtraction logic operative to subtract the signal on the second input from the signal on the first, input;

decision logic having an input and an output, the input coupled to the output of the subtraction logic, the decision logic operative to decide on a state of a sampled symbol; and a FBF having a first input and first and second outputs, the input coupled to the output of the decision logic, the FBF having at least a first post-cursor tap providing the first output, the FBF operative to reduce post-cursors in the sampled transmitted signal to produce a feedback filtered signal at the second output, the second output coupled to the second input of the subtraction logic; and a timing error detector having first, second, and third inputs and an output, the first input coupled to the first output of the FBF, the second input coupled to the second output of the FFF, and the third input coupled to the first out put of the FFF, the timing error detector operative to provide at the output a signal that includes a ratio of the first and second inputs, wherein the signal is representative of the timing error reflected in the sampled transmitted signal, the signal provided at the output of the timing error detector being used to derive the clock signal at the second input of the ADC.

16. The baud-rate timing recovery system of claim 15, wherein the system further comprises:

a loop filter having an input and an output, the input coupled to the output of the timing error detector, the loop filter operative to filter the signal provided by the timing error detector; and a VCO having an input and an output, the input coupled to the output of the loop filter, the output coupled to the second input of the ADC, the VCO operative to provide a clock signal as a function of the voltage supplied by the loop filter.

17. The baud-rate timing recovery system of claim 15, wherein the system further comprises:

a NCO having an input and en output of the NCO coupled to the output of the timing error detector, the output of the NCO coupled to the second input of the ADC, the NCO operative to provide a clock signal as a function of the signal supplied by the timing error detector.

18. The baud-rate timing recovery system of claim 15, wherein the timing error detector comprises timing function means for providing at the output a signal representative of the timing error reflected in the sampled transmitted signal, the timing function means operative to provide a signal according to the timing function:

$$z_0(n) = \alpha_0 \frac{b(1)}{w(N-1)} + \beta_0 \frac{w(N-2)}{w(N-1)^2}.$$

19. The band-rate, timing recovery system of claim 15, wherein the timing error detector comprises timing function means for providing at the output a signal representative of the timing error reflected in the sampled transmitted signal, the timing function means operative to provide a signal according to the timing function:

$$z_1(n) = \alpha_1 b(1) + \beta_1 \frac{w(N-2)}{w(N-1)}.$$

20. The baud-rate timing recovery system of claim 15, wherein the timing error detector comprises timing function means for providing at the output a signal representative of the timing error reflected in the sampled transmitted signal, the timing function means operative to provide a signal according to the timing function: $z_2=a_2 b(1)w(N-1)+\beta_2 w(N-2)$.

* * * * *